US012642394B2

(12) United States Patent
Bergmann

(10) Patent No.: US 12,642,394 B2
(45) Date of Patent: Jun. 2, 2026

(54) HOLDER FOR SINK ACCESSORY

(71) Applicant: SE-KURE CONTROLS, INC.,
Franklin Park, IL (US)

(72) Inventor: Gustavo Bergmann, Chicago, IL (US)

(73) Assignee: Se-Kure Controls, Inc., Franklin Park,
IL (US)

( * ) Notice: Subject to any disclaimer, the term of this
patent is extended or adjusted under 35
U.S.C. 154(b) by 114 days.

(21) Appl. No.: 18/653,399

(22) Filed: May 2, 2024

(65) Prior Publication Data
US 2025/0151957 A1    May 15, 2025

Related U.S. Application Data

(60) Provisional application No. 63/598,445, filed on Nov.
13, 2023.

(51) Int. Cl.
*A47J 47/20* (2019.01)

(52) U.S. Cl.
CPC ..................................... *A47J 47/20* (2013.01)

(58) Field of Classification Search
CPC ...................................................... A47J 47/20
USPC ............................................ 4/654, 619, 680
See application file for complete search history.

(56) References Cited

U.S. PATENT DOCUMENTS 9,574,333 B2 * 2/2017 O'Brien ................ A47J 47/005
10,329,755 B2 * 6/2019 Zver ......................... E03C 1/33

2007/0157378 A1 * 7/2007 Kendall ................... E03C 1/182
                                                        4/630
2008/0210593 A1 * 9/2008 Cornwell ............... B25H 3/003
                                                        206/234
2011/0067176 A1 * 3/2011 Walton .................... E03C 1/266
                                                        4/695
2012/0240330 A1 * 9/2012 Fulford ................... E03C 1/244
                                                        4/654
2013/0276226 A1 * 10/2013 Cook ...................... A47K 3/40
                                                        4/613
2013/0283521 A1 * 10/2013 Jain ........................ E03C 1/186
                                                        4/654
2014/0259377 A1 * 9/2014 Eilmus .................... A47J 47/20
                                                        4/639
2015/0067962 A1 * 3/2015 O'Brien ................ A47J 47/005
                                                        4/630

(Continued)

FOREIGN PATENT DOCUMENTS

CA          3003987 C  * 7/2019  ............. B44D 3/126
DE   102011010291 A1 * 8/2012  ............. E03C 1/335

(Continued)

*Primary Examiner* — Lori L Baker
(74) *Attorney, Agent, or Firm* — Wood, Phillips, Katz,
Clark & Mortimer

(57) ABSTRACT

The combination of: a sink with a basin compartment and
having an exposed surface with a metal portion; an acces-
sory usable in conjunction with the sink; and a holder for
releasably supporting the accessory in a staged position. The
holder has a body and at least one component on the body
that is magnetically attracted to the exposed metal surface
portion to releasably maintain the holder in an operative
position. The component is connected to the body so as to be
movable relative to the body between: i) a stored position;
and ii) a ready position. The holder has at least one outside
dimension that is reduced with the at least one component
changed from the ready position into the stored position.

22 Claims, 8 Drawing Sheets

(56)    References Cited

U.S. PATENT DOCUMENTS

| | | | | |
|---|---|---|---|---|
| 2015/0230667 A1* | 8/2015 | Palazzolo | ................. | E03C 1/18 |
| | | | | 4/654 |
| 2016/0206176 A1* | 7/2016 | Eilmus | .................... | A47J 47/20 |
| 2017/0181542 A1* | 6/2017 | Comeau | ................. | A47B 77/14 |
| 2017/0245693 A1* | 8/2017 | Palazzolo | ................. | E03C 1/18 |
| 2021/0235940 A1* | 8/2021 | Hyde | ........................ | A47K 1/09 |
| 2022/0248934 A1* | 8/2022 | Welling | ................ | A47L 15/507 |
| 2024/0247471 A1* | 7/2024 | Torak | .................... | A47K 10/08 |
| 2025/0277357 A1* | 9/2025 | Detlaff | .................... | A47J 47/18 |

FOREIGN PATENT DOCUMENTS

| | | | | | |
|---|---|---|---|---|---|
| EP | 3861908 B1 | * | 7/2025 | ............. | A47K 3/001 |
| WO | WO-2012030676 A2 | * | 3/2012 | ............. | A47J 43/24 |
| WO | WO-2023034943 A2 | * | 3/2023 | ............. | F16B 47/00 |
| WO | WO-2024220314 A2 | * | 10/2024 | ............. | A47J 47/20 |

* cited by examiner

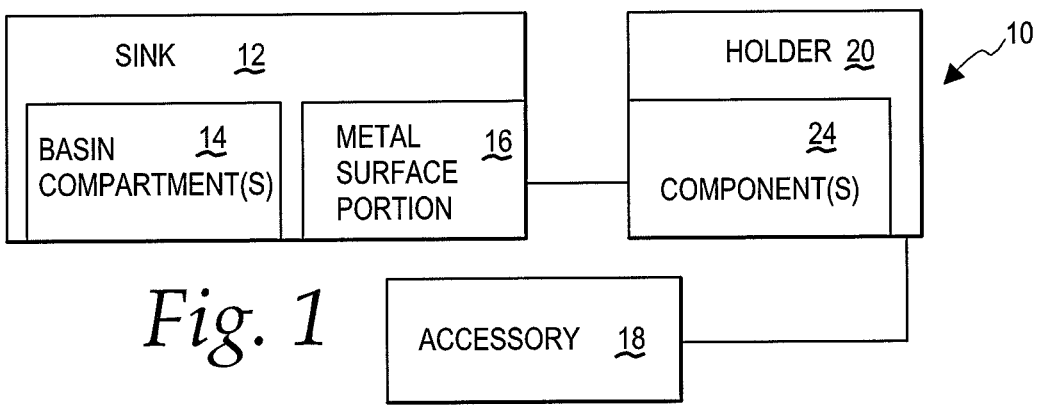
*Fig. 1*
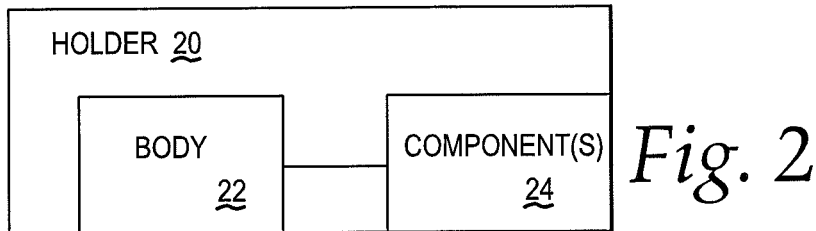
*Fig. 2*
*Fig. 3*
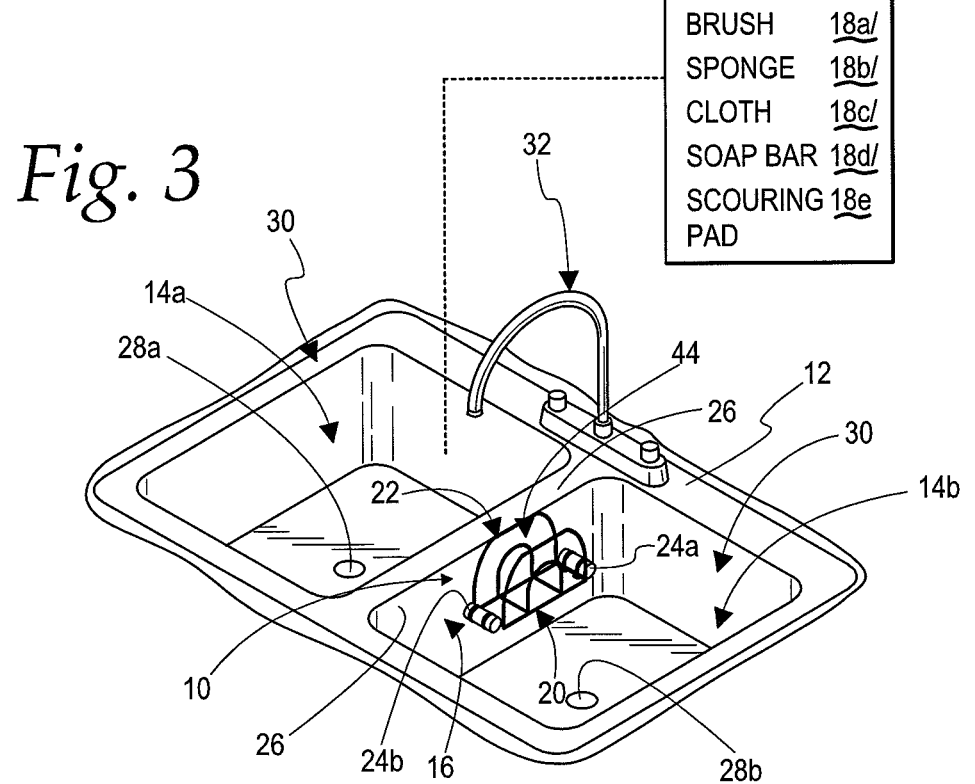

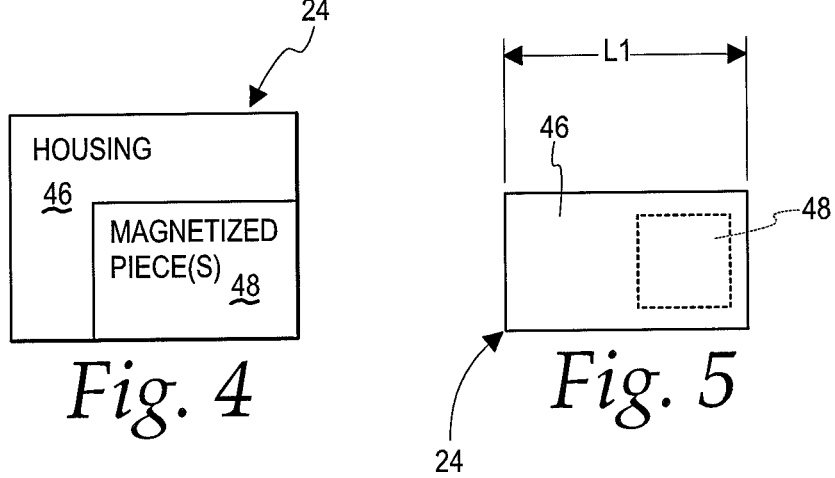
*Fig. 4*
*Fig. 5*
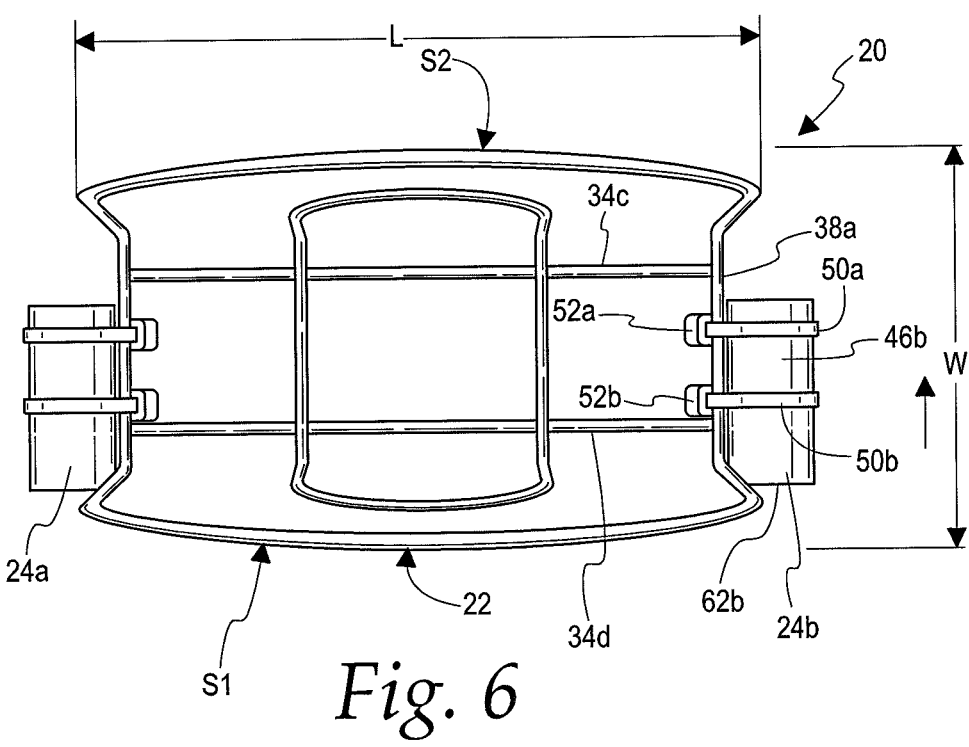
*Fig. 6*

HOLDER FOR SINK ACCESSORY

CROSS-REFERENCE TO RELATED APPLICATIONS

This is a non-provisional application claiming priority to U.S. Provisional Application No. 63/598,445, filed Nov. 13, 2023, which is incorporated herein by reference.

BACKGROUND OF THE INVENTION

Field of the Invention

This invention relates to sinks with at least one basin compartment and, more particularly, to a holder for an accessory commonly used in conjunction with the sinks.

Background Art

Many different accessories are utilized around sinks with basin compartments. For example, with a kitchen sink, brushes, sponges, scrubbing pads, cloths, bars of soap, etc., are commonly utilized to assist cleaning of the sink and articles within the basin compartment, as well as articles and/or surfaces in the vicinity thereof. For convenience, discrete receptacles are commonly provided for these accessories at or near the sink so that accessories staged therein are consistently available when needed. These receptacles have taken a number of different forms.

In one form, a holder defining a receptacle is releasably maintained in an operative position on a peripheral wall of a sink using one or more suction cups.

In another form, a holder is formed with a body defining a receptacle and having an inverted "U" shape that can be placed in straddling relationship to a wall between adjacent basin compartments.

In another form, the body of the holder is fixedly adhered to a surface of the sink. This alternative makes removal or repositioning of the holder more challenging.

In still another form, magnets are utilized to maintain holders in place on sink walls that have a metal construction.

With the above and other holder designs, it is common to make a somewhat skeletal structure for supporting the accessory whereby liquid and foreign matter carried on the accessories are allowed to pass therethrough into the basin compartment. Formed wire configurations are common since they are light in weight, perform the pass-through function, and may be manufactured relatively inexpensively.

Given the affordability of particularly the wire form designs, holders in this category are often sold in high volume. Since they generally are relatively shape-retentive, they lend themselves to being press fit into a conforming shipping carton made of thin paper or cardboard material.

Designers of this type of product must address the competing objectives of defining a holder with an adequate capacity and one that does not require a shipping carton that has a large size necessary to surround the outer perimeter shape of the holder. Larger cartons are more costly to produce, store, and handle.

Since some of the above designs have discrete projecting mounting parts that add to the outer dimension, cartons must be designed to accommodate these projecting parts, which may necessitate larger cartons and create significant unused volumes within the carton. For example, an overall square carton, that would closely surround the primary holder shape in the absence of a discrete projecting part, may have to be increased in size in multiple dimensions to accommodate the discrete projecting part and maintain the square carton shape.

Further, the cartons may be compromised by sharp discrete projections. At the same time, the sharp discrete projections may be prone to being damaged during handling of the cartons, given the inherently fragile nature of formed wire pieces.

The industry continues to strive to maximize efficiency in handling of low price items such as sink holders by simplifying packaging, reducing packaging costs, and avoiding loss resulting from compromised cartons or products within those cartons.

SUMMARY OF THE INVENTION

In one form, the invention is directed to the combination of: a) a sink having a basin compartment into which articles can be directed as for cleaning; b) an accessory usable in conjunction with the sink; and c) a holder for releasably supporting the accessory in a staged position. The sink has an exposed surface with at least a portion of the exposed surface being metal. The holder has a body. At least one component on the body is magnetically attracted to the exposed metal surface portion to thereby releasably maintain the holder in an operative position with respect to the sink. The at least one component is connected to the body so as to be movable relative to the body between: i) a stored position; and ii) a ready position. The holder has an outside dimension that is reduced with the at least one component in the stored position compared to a corresponding outside dimension with the at least one component in the ready position.

In one form, the at least one component is magnetically attracted to a part of the body so that a magnetic attractive force urges the at least one component into the stored position.

In one form, the at least one component is movable guidingly relative to the body between the stored and ready position.

In one form, the at least one component pivots relative to the body in moving between the stored and ready positions.

In one form, the at least one component translates relative to the body in moving between the stored and ready positions In one form, with the holder in the operative position, the body has a substantially flat shelf surface that faces upwardly. As an incident of changing from the ready position into the stored position, the at least one component projects further upwardly relative to the flat shelf surface.

In one form, with the at least one component in the ready position, the at least one component projects to above the flat shelf surface.

In one form, the body is made substantially entirely from formed wire pieces.

In one form, the at least one component consists of first and second components on the body that are magnetically attracted to the exposed metal surface portion to cooperatively maintain the holder in the operative position.

In one form, the at least one component has a housing. At least one magnetized piece is supported by the housing.

In one form, a section of the exposed surface is metal and faces in one direction. The holder has a side wall that faces oppositely to the one direction with the holder in the operative position. A magnetic attractive force between the at least one component and the metal section of the exposed surface causes the side wall of the holder to be urged towards the metal section of the exposed surface.

In one form, the body has a U-shaped receptacle that opens upwardly with the holder in the operative position.

In one form, the accessory is at least one of: a) a brush; b) a sponge; c) a cloth, d) a soap bar; and e) a scouring pad.

In one form, the first and second components are closer together with the first and second components in respective stored positions than with the first and second components in respective ready positions.

In one form, the body has a length dimension, a width dimension, and a height dimension. With the first and second components in respective stored positions, the first and second components are closer together along the length dimension of the body.

In one form, the at least one component has a surface that abuts a surface of the body as an incident of the at least one component being translated relative to the body in moving from the ready position into the stored position.

In one form, the body has a wire length. The at least one accessory has a housing. A strap extends around the housing and wire length to establish a pivot connection between the at least one component and body.

In one form, the housing has a cylindrical shape with an axial length and a diameter. The axial length of the housing is greater than the diameter of the housing.

In one form, the housing is molded around the at least one magnetized piece.

BRIEF DESCRIPTION OF THE DRAWINGS

FIG. 1 is a schematic representation of a system, according to the present invention, including a sink and a holder for an accessory that is placed in an operative position on the sink;

FIG. 2 is a schematic representation showing further details of the holder in FIG. 1;

FIG. 3 is a perspective view of a conventional type sink with one exemplary form of holder, according to the present invention, in an operative position thereon;

FIG. 4 is a schematic representation of a component on the holder used to maintain the holder in the operative position on the sink;

FIG. 5 is an elevation view of one exemplary form of the component as shown schematically in FIG. 4;

FIG. 6 is a plan view of the holder in FIG. 3 and with a pair of components, as shown in FIG. 5, in ready positions thereon;

DETAILED DESCRIPTION OF THE PREFERRED EMBODIMENT

Figures 7, 8:
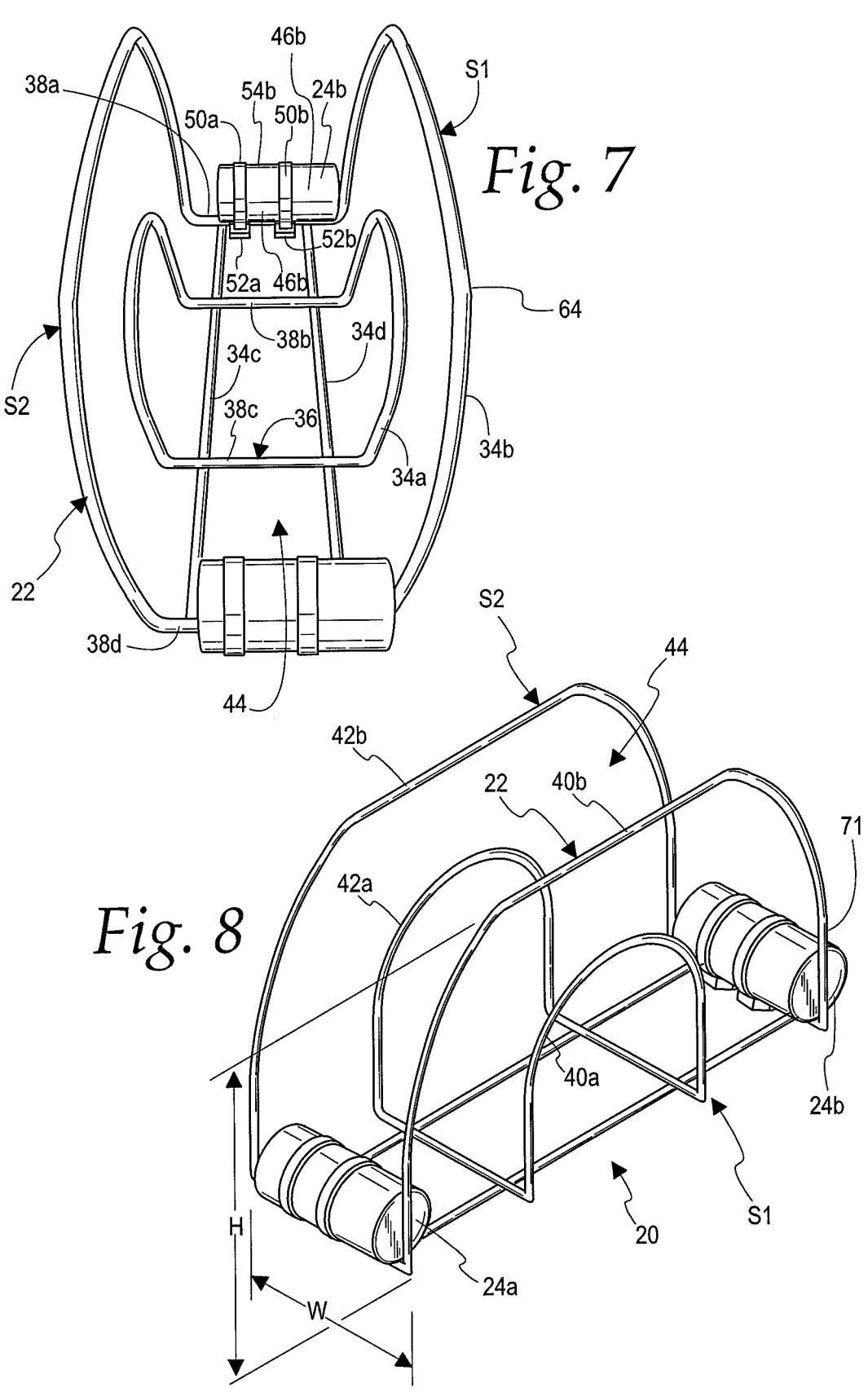
FIG. 7 is an end perspective view of the holder in FIG. 6 with the components moved from the ready positions of FIG. 6 into stored positions.
FIG. 8 is a view of the holder and components in the FIG. 7 state and from a different perspective.

The present invention is directed to a system, as shown schematically in FIG. 1 at 10. The system 10 consists of a conventional type sink 12 with one or more basin compartments 14 into which articles can be directed, as for cleaning in a contained liquid. The sink 12 has an exposed surface with at least a portion 16 of the exposed surface being made from metal.

An accessory 18, as schematically depicted, is intended to encompass virtually any type of portable object that is used in conjunction with the sink 12-be it to clean articles in the sink compartment 14 or the sink itself, or to perform other tasks typically performed around sinks. For example, but without limitation, the accessory 18 may be: a) a brush; b) a sponge; c) a cloth; d) a soap bar; e) a scouring pad, etc.

As noted in the Background Art portion herein, it is desirable to keep accessories 18 readily available when they are needed. For that purpose, a holder 20 is provided for releasably supporting one or more accessories 18 in a readily accessible staged position.

The inventive holder 20, as shown additionally in FIG. 2, has a body 22 and at least one component 24 on the body 22 that is magnetically attracted to the exposed metal surface portion 16, thereby to releasably maintain the holder 20 in an operative position with respect to the sink 12.

The schematic depiction in FIG. 2 is intended to encompass any structure that allows each of the component(s) 24 to be connected to the body 22 so as to be movable relative to the body between: a) a stored position; and b) a ready position. This may be accomplished through connectors, separately on the body 22 and component(s) 24, that cooperate to allow this relative movement, or may be a different arrangement through an independent element that allows the relative movement between the component(s) 24 and the body 22, as described herein.

The holder 20 has at least one outside dimension that is reduced with the at least one component 24 in the stored position compared to a corresponding outside dimension with the at least one component in the ready position.

The schematic depictions in FIGS. 1 and 2 are intended to encompass virtually an unlimited number of variations of each of the components depicted therein as well as their interactions. An exemplary form of the system 10 will be described hereinbelow with reference to FIGS. 3-15, with it being understood that the specific system configuration is exemplary in nature only and should not be viewed as limiting in any respect.

In FIG. 3 the sink 12 is shown with separate basin compartments 14a, 14b with separate holding volumes separated by a dividing wall 26. Each of the basin compartments 14a, 14b has a generally upwardly opening cup-shaped configuration, with drains 28a, 28b at respective bottoms thereof.

The sink 12 has an exposed surface 30 with at least the aforementioned portion 16 thereof defined by metal.

As depicted, a faucet 32 is mounted to discharge water selectively into the basin compartments 14a, 14b.

It is not critical where the metal surface portion 16 is located or, in the event that the entire sink 12 is made from metal, precisely where the holder 20 is placed in an operative position. As depicted, the exemplary selected mounting location for the holder 20 is on one side of the dividing wall 26.

In the particular embodiment, the body 22 is defined substantially entirely by a plurality of formed and joined wire pieces 34a, 34b, 34c, 34d. The precise number of wire pieces 34 is entirely a design consideration, as is the specific shape of each individual piece 34, as well as the overall shape of the body 22 defined cooperatively by the pieces 34. As depicted, all of the wire pieces 34 are made from a metal material, though again this is not a requirement.

The overall body 22 has an outside length dimension L, an outside width dimension W, and an outside height dimension H, which may vary widely in terms of dimensional value and dimensional relationship.

The body 22 has a bottom surface 36 defined cooperatively by laterally extending wire lengths 38a, 38b, 38c, 38d spaced along the length of the body. The bottom surface 36 faces upwardly with the holder 20 in the operative position depicted in FIG. 3.

Inverted U-shaped wire lengths 40a, 40b define one side S1 of the body, with similarly arranged wire lengths 42a, 42b defining the opposite side S2 of the body. As depicted, the sides S1, S2 reside in substantially parallel planes, though this is not a requirement.

The sides S1, S2 and bottom surface 36 cooperatively bound an upwardly opening, U-shaped receptacle 44 for the particular accessory, shown in exemplary forms in FIG. 3 as a brush 18a, a sponge 18b, a cloth 18c, a soap bar 18d, and a scouring 18e. As noted, the schematic depiction of the accessory 18 in FIG. 1 is intended to encompass these specific forms and others. The depicted receptacle 44 has open lengthwise ends.

With the holder 20 releasably supported in one operative position with respect to the sink 12, as shown in FIG. 3, one or more of the accessories 18 can be releasably supported in a staged position in the holder receptacle 44 to be accessed thereat and removed therefrom.

As shown schematically in FIG. 4, the at least one component 24 consists of a housing 46 with at least one magnetized piece 48 supported on the housing. As used herein, the term "housing" is intended to encompass any structure that is movable with the magnetized piece 48 as a unit.

In one exemplary form, as shown in FIG. 5, the at least one component 24 has a block- or disk- or cylindrically-shaped magnetized piece 48 around which the housing 46 is molded, whereby the magnetized piece 48, as depicted, is fully encased by the housing 46. This specific form is exemplary in nature only within the schematic showing in FIG. 4.

While a single component 24 might be utilized to releasably maintain the holder 20 in an operative position, in the depicted embodiment, first and second components 24a, 24b, of like construction, are utilized and magnetically attracted to the same or different exposed metal surface portions to releasably maintain the holder in an operative position with respect to the sink 12, whereupon one or more of the accessories 18 may be supported on the holder, as within the receptacle 44, in a staged position.

Each of the components 24 has an axial length L1 that is less than the width of the receptacle 44 between the sides S1, S2. Each of the components 24a, 24b is connected to the body 22 in the same fashion to be movable between the aforementioned stored and ready positions.

With the exemplary component 24b, the length L1 thereof is aligned with the length of the wire piece 38a with the associated housing 46b rested thereagainst. Spaced straps 50a, 50b each extends continuously around the housing 46b and wire piece 38a at axially spaced locations. The straps 50a, 50b respectively have projections 52a, 52b extending generally tangentially to the outer surface 54b of the housing 46b. The outer housing surface 54b has annular undercuts to seat each of the straps 50a, 50b to confine axial shifting thereof relative to the housing 46b.

In one exemplary form, each of the straps 50 may be a conventional "zip tie" that is tightened in place.

With this arrangement, the housing 46b is pivotable around the wire length 38a which effectively defines a pivoting axis.

This same mounting arrangement allows the housing 46b to be guided in translation along the length of the wire piece 38a.

The straps 50a, 50b as depicted are located so that the projections 52a, 52b thereon respectively abut the wire piece 34c, 34d to thereby confine opposite translational movement of the housing 46b along the wire length 38a to a predetermined range.

Figure 11:
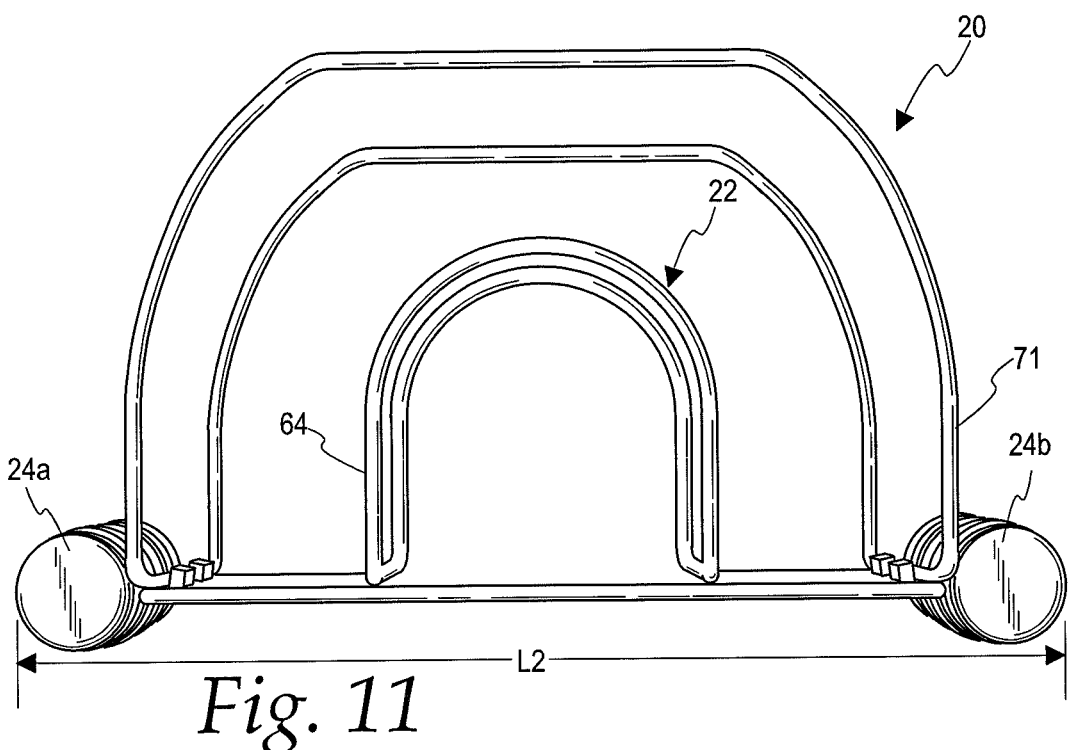
FIG. 11 is a side elevation view of the holder in the FIG. 6 state.
Figure 13:
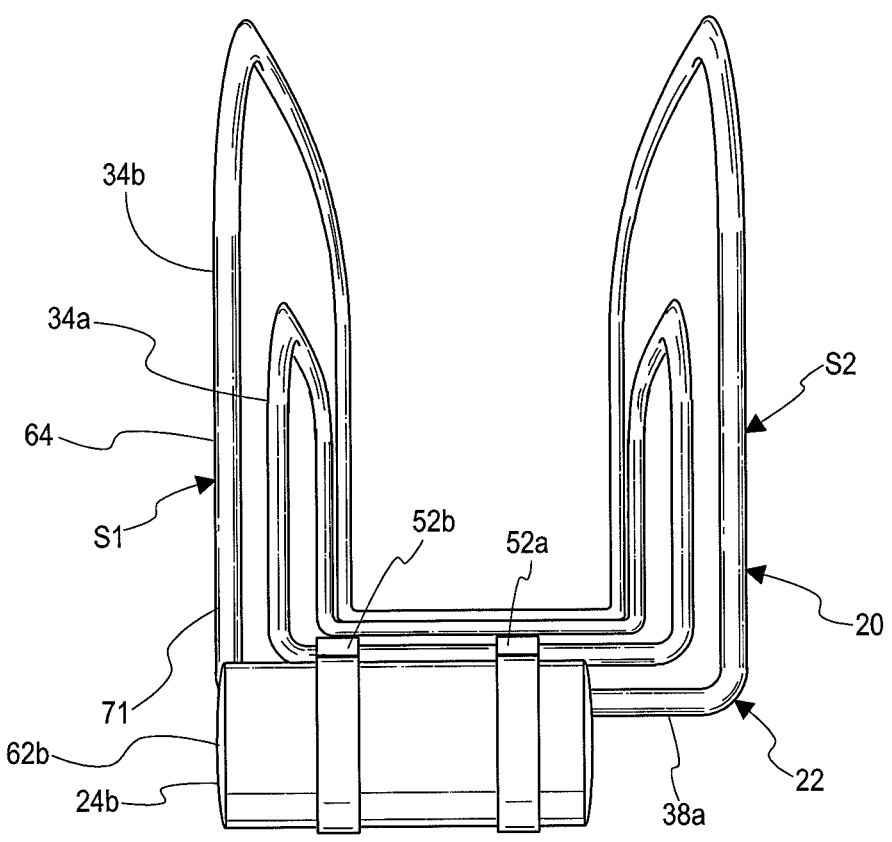
FIG. 13 is an end elevation view of the holder and components in the state of FIGS. 6 and 11.

In FIGS. 6, 11, and 13, the accessories 24a, 24b are each shown in their respective ready positions. Since the ready positions correspond for the components 24a, 24b, the ready position will be described with respect to the representative component 24b. As seen clearly in FIGS. 6 and 11, the component 24b is angularly oriented relative to the body 22 and translated along the length of the wire piece 38a so that an axially facing end surface 62b is flush with, or adjacent to, a laterally facing side surface 64 defined by part or all of the wire pieces 34a, 34b at the side S1.

Accordingly, with the side surface 64 placed at or adjacent the oppositely facing metal surface portion 16, a magnetic attraction force is developed between the component 24b and the metal surface portion 16 that causes the side surface 64 of the holder 20 to be urged towards the metal surface portion 16.

The component 24a cooperates in the same fashion, whereby the components 24a, 24b cooperatively urge the holder 20 into, and maintain the holder 20 in, the operative position therefor.

With both components 24a, 24b in the ready position, as seen most clearly in FIG. 11, the holder 20 has an overall length L2, including the diameters of the components 24a, 24b, that is greater than the corresponding length L of the holder 20 by itself.

Figures 9, 10:
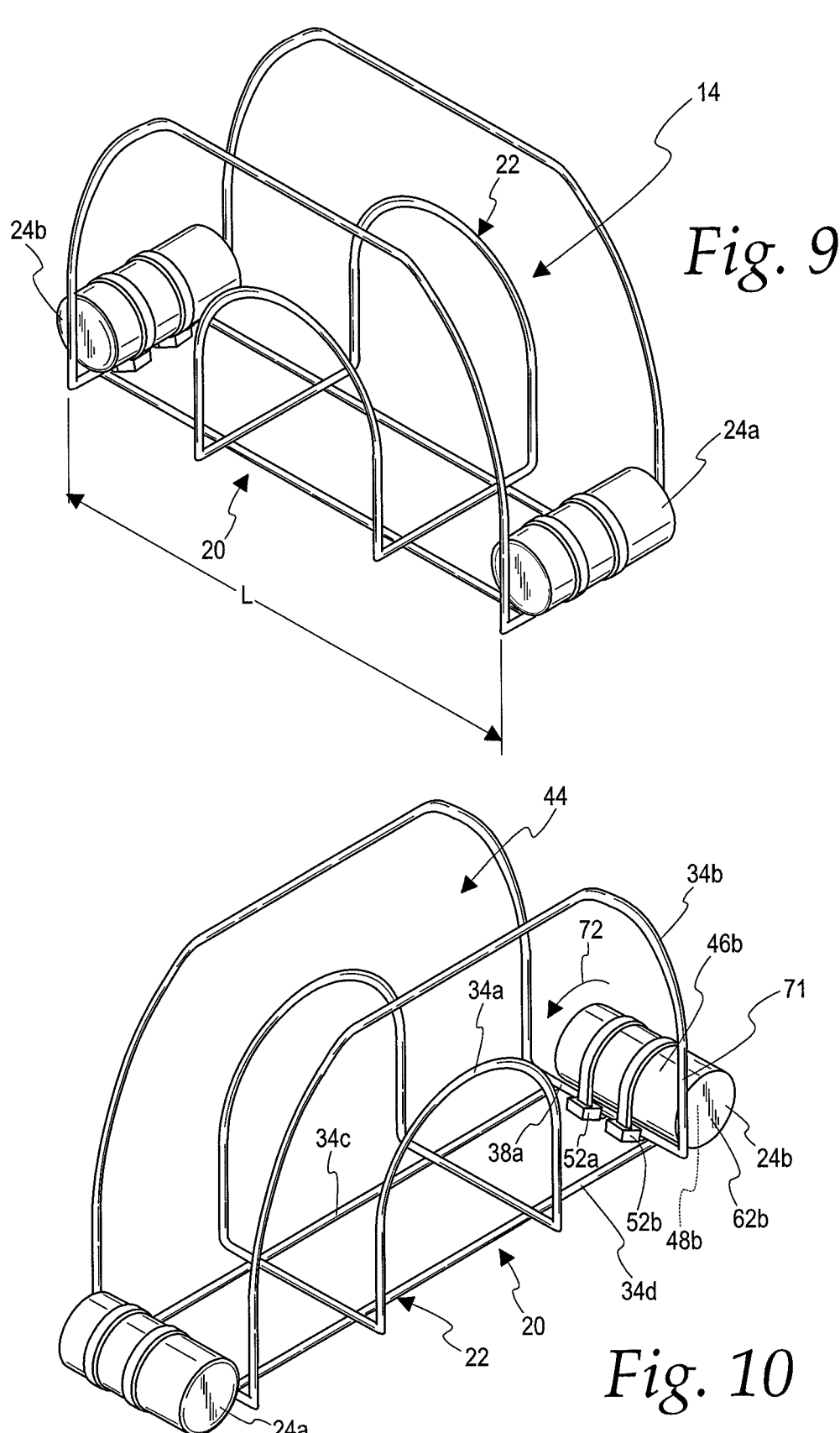
FIG. 9 is a view of the holder and components in the FIG. 7 state and from another perspective.
FIG. 10 is a view as in FIG. 8 wherein the components have been pivoted away from their stored positions.
Figure 12:
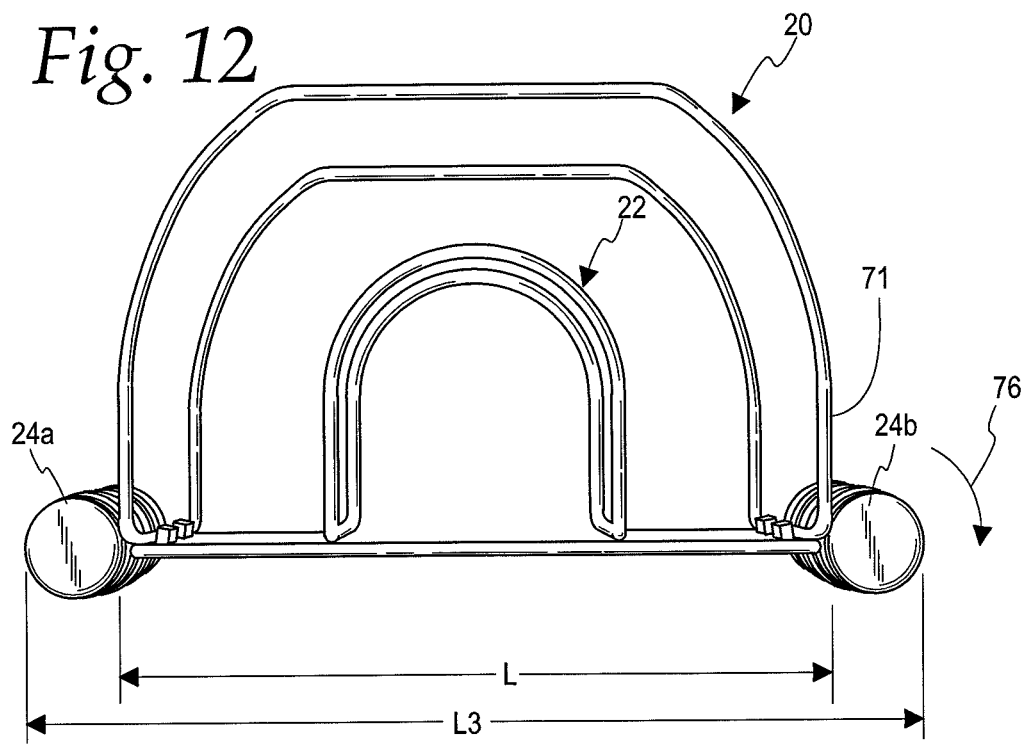
FIG. 12 is a view as in FIG. 11 wherein the components are changed from ready positions into stored positions, as shown also in FIG. 8.
Figure 14:
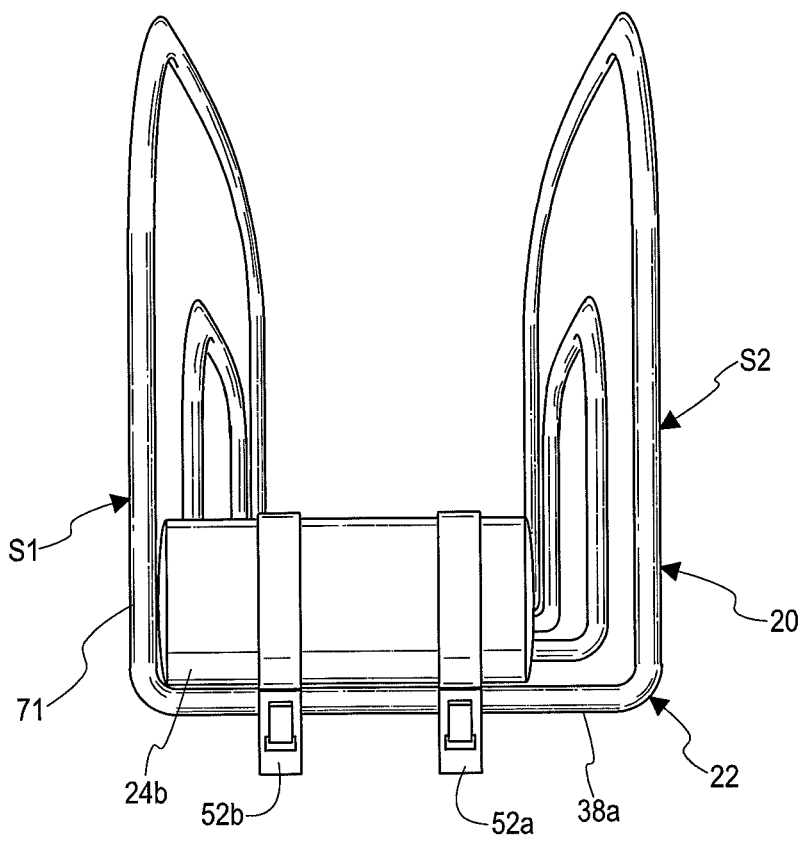
FIG. 14 is a view as in FIG. 13 with the holder and components in the state of FIGS. 7-9 and 12.

To place the components 24a, 24b in their respective stored positions, the representative component 24b is translated along the wire piece 38a in the direction of the arrow 70 in FIG. 6 until the end surface 62b moves past an upwardly projecting wire length 71 on the wire length 40b, whereupon the component 24b can be pivoted in the direction of the arrow 72 in FIG. 10 to assume the position of FIGS. 12 and 14. With both components 24a, 24b in their respective stored positions, as shown in FIG. 12, the holder 20 has an outside length dimension L3 that is less than the dimension L2 as shown in FIG. 11.

While not required, the wire length 71 is made from a metal material such that a magnetic attraction force is generated between the magnetized piece 48b within the component 24b and the wire length 71. As the component 24b is pivoted in the direction of the arrow 72 and approaches the stored position, this attractive force urges the component 24b fully into the stored position and tends to releasably maintain this relationship. Once the component 24b is in the stored position of FIG. 12, pivoting in the direction of the arrow 76 to within a certain range reduces the magnitude of the attractive force so that the FIG. 11 angular orientation can be maintained.

Figure 15:
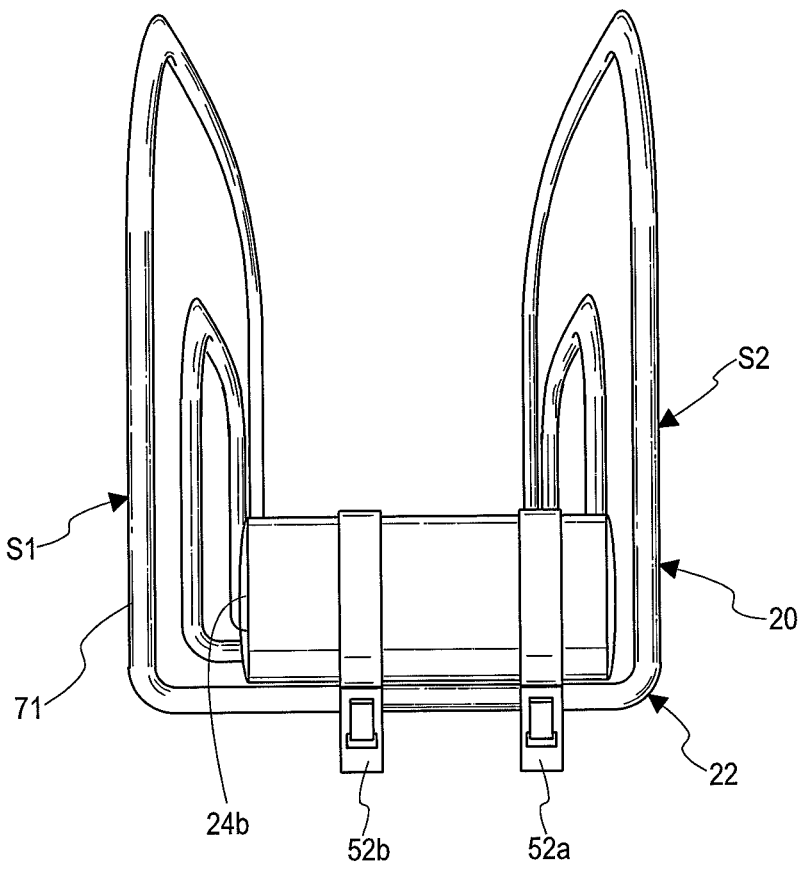
FIG. 15 is a view as in FIG. 13 with the components in secondary stored positions.

Once in the stored position of FIG. 14, the component 24*b* can be further translated along the wire piece 38*a* in the direction of the arrow 70 to the FIG. 15 position, wherein the magnitude of the attractive force between the component 24*b* and the wire length 71 is reduced. This represents a secondary stored position wherein the component 24*b* is allowed to pivot further in the direction of the arrow 72 to rest against the wire piece 38*b* and thereby further reduce the overall length dimension of the holder 20.

In moving from the ready position into the stored position, the component 24*b* shifts to above the bottom surface 36 and resides primarily within the receptacle 44, thereby reducing the height dimension of the holder 20. This compact shape thus allows the use of a smaller carton to surround the outer perimeter of, and contain, the holder 20.

As seen in FIG. 10, the projection 52*b* is strategically situated to abut the wire piece 34*d* to consistently limit movement of the component 24*b* as it is translated into its ready position. The projection 52*a* abuts the wire piece 34*c* to consistently limit translational movement of the component 24*b* into the secondary stored position.

In the depicted form, while not required, the components 24*a*, 24*b* have a cylindrical shape with an axial length that is greater than the diameter thereof and less than a width of the receptacle 44.

The foregoing disclosure of specific embodiments is intended to be illustrative of the broad concepts comprehended by the invention.

The invention claimed is:

1. In combination:
 a) a sink comprising a basin compartment into which articles can be directed as for cleaning,
 the sink having an exposed surface with at least a portion of the exposed surface comprising metal;
 b) an accessory usable in conjunction with the sink; and
 c) a holder for releasably supporting the accessory in a staged position,
 the holder comprising a body and at least one component on the body that is magnetically attracted to the exposed metal surface portion to thereby releasably maintain the holder in an operative position with respect to the sink,
 the at least one component connected to the body so as to be movable relative to the body between: i) a stored position; and ii) a ready position,
 wherein the at least one component pivots relative to the body in moving between the stored and ready positions.

2. In combination according to claim 1:
 a) a sink comprising a basin compartment into which articles can be directed as for cleaning,
 the sink having an exposed surface with at least a portion of the exposed surface comprising metal;
 b) an accessory usable in conjunction with the sink; and
 c) a holder for releasably supporting the accessory in a staged position,
 the holder comprising a body and at least one component on the body that is magnetically attracted to the exposed metal surface portion to thereby releasably maintain the holder in an operative position with respect to the sink,
 the at least one component connected to the body so as to be movable relative to the body between: i) a stored position; and ii) a ready position,

wherein the at least one component is magnetically attracted to a part of the body so that a magnetic attractive force urges the at least one component into the stored position.

3. In combination:
 a) a sink comprising a basin compartment into which articles can be directed as for cleaning,
 the sink having an exposed surface with at least a portion of the exposed surface comprising metal;
 b) an accessory usable in conjunction with the sink; and
 c) a holder for releasably supporting the accessory in a staged position,
 the holder comprising a body and at least one component on the body that is magnetically attracted to the exposed metal surface portion to thereby releasably maintain the holder in an operative position with respect to the sink,
 the at least one component connected to the body so as to be movable relative to the body between: i) a stored position; and ii) a ready position,
 wherein the at least one component and body are configured so that the at least one component is movable guidingly relative to the body between the stored and ready position.

4. The combination according to claim 3 wherein the at least one component pivots relative to the body in moving between the stored and ready positions.

5. The combination according to claim 1 wherein the at least one component translates relative to the body in moving between the stored and ready positions.

6. The combination according to claim 4 wherein the at least one component translates relative to the body in moving between the stored and ready position.

7. In combination according to claim 1:
 a) a sink comprising a basin compartment into which articles can be directed as for cleaning,
 the sink having an exposed surface with at least a portion of the exposed surface comprising metal;
 b) an accessory usable in conjunction with the sink; and
 c) a holder for releasably supporting the accessory in a staged position,
 the holder comprising a body and at least one component on the body that is magnetically attracted to the exposed metal surface portion to thereby releasably maintain the holder in an operative position with respect to the sink,
 the at least one component connected to the body so as to be movable relative to the body between: i) a stored position; and ii) a ready position,
 wherein with the holder in the operative position, the body defines a substantially flat shelf surface that faces upwardly and upon the at least one component changing from the ready position into the stored position, the at least one component projects further upwardly relative to the flat shelf surface.

8. The combination according to claim 7 wherein with the at least one component in the ready position, the at least one component projects to above the flat shelf surface.

9. The combination according to claim 1 wherein the body is made substantially entirely from formed wire pieces.

10. In combination:
 a) a sink comprising a basin compartment into which articles can be directed as for cleaning,
 the sink having an exposed surface with at least a portion of the exposed surface comprising metal;
 b) an accessory usable in conjunction with the sink; and c) a holder for releasably supporting the accessory in a staged position, the holder comprising a body and at least one component on the body that is magnetically attracted to the exposed metal surface portion to thereby releasably maintain the holder in an operative position with respect to the sink, the at least one component connected to the body so as to be movable relative to the body between: i) a stored position; and ii) a ready position, wherein the at least one component comprises first and second components on the body that are magnetically attracted to the exposed metal surface portion to cooperatively maintain the holder in the operative position.

11. In combination according to claim 1:

a) a sink comprising a basin compartment into which articles can be directed as for cleaning, the sink having an exposed surface with at least a portion of the exposed surface comprising metal;

b) an accessory usable in conjunction with the sink; and c) a holder for releasably supporting the accessory in a staged position, the holder comprising a body and at least one component on the body that is magnetically attracted to the exposed metal surface portion to thereby releasably maintain the holder in an operative position with respect to the sink, the at least one component connected to the body so as to be movable relative to the body between: i) a stored position; and ii) a ready position, wherein the at least one component comprises a housing and at least one magnetized piece supported by the housing.

12. The combination according to claim 1 wherein a section of the exposed surface comprising metal faces in one direction and the holder has a side wall that faces oppositely to the one direction with the holder in the operative position and a magnetic attractive force between the at least one component and the metal section of the exposed surface causes the side wall of the holder to be urged towards the metal section of the exposed surface.

13. The combination according to claim 1 wherein the body defines a U-shaped receptacle that opens upwardly with the holder in the operative position.

14. The combination according to claim 1 wherein the accessory is at least one of: a) a brush; b) a sponge; c) a cloth; d) a soap bar; and e) a scouring pad.

15. The combination according to claim 10 wherein the first and second components are closer together with the first and second components in respective stored positions than with the first and second components in respective ready positions.

16. The combination according to claim 15 wherein the body has a length dimension, a width dimension, and a height dimension and with the first and second components in respective stored positions, the first and second components are closer together along the length dimension of the body.

17. The combination according to claim 3 wherein the at least one component has a surface that abuts a surface of the body as an incident of the at least one component being translated relative to the body in moving from the ready position into the stored position.

18. The combination according to claim 4 wherein the body has a wire length, the at least one accessory comprises a housing and a strap extends around the housing and wire length to establish a pivot connection between the at least one component and body.

19. The combination according to claim 11 wherein the housing has a cylindrical shape with an axial length and a diameter and the axial length of the housing is greater than the diameter of the housing.

20. The combination according to claim 19 wherein the housing is molded around the at least one magnetized piece.

21. The combination according to claim 1 wherein the holder has an outside dimension that is reduced with the at least one component in the stored position compared to a corresponding outside dimension with the at least one component in the ready position.

22. The combination according to claim 3 wherein the holder has an outside dimension that is reduced with the at least one component in the stored position compared to a corresponding outside dimension with the at least one component in the ready position.

* * * * *